United States Patent
D'Amato et al.

(10) Patent No.: US 10,037,695 B2
(45) Date of Patent: Jul. 31, 2018

(54) PERSONALIZED ROUTE INDICES VIA CROWD-SOURCED DATA

(71) Applicant: Ford Global Technologies, LLC, Dearborn, MI (US)

(72) Inventors: Anthony Mario D'Amato, Canton, MI (US); John Ottavio Michelini, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 14/520,422

(22) Filed: Oct. 22, 2014

(65) Prior Publication Data

US 2016/0117921 A1    Apr. 28, 2016

(51) Int. Cl.
*G08G 1/00* (2006.01)
*G08G 1/0967* (2006.01)
*G08G 1/01* (2006.01)
*G07C 5/00* (2006.01)
*G06F 3/0484* (2013.01)

(52) U.S. Cl.
CPC ..... *G08G 1/096775* (2013.01); *G06F 3/0484* (2013.01); *G07C 5/008* (2013.01); *G08G 1/0112* (2013.01); *G08G 1/0133* (2013.01); *G08G 1/0141* (2013.01); *G08G 1/096716* (2013.01); *G08G 1/096741* (2013.01)

(58) Field of Classification Search
None
See application file for complete search history.

(56) References Cited

U.S. PATENT DOCUMENTS

| | | |
|---|---|---|
| 6,175,803 B1 | 1/2001 | Chowanic et al. |
| 6,542,812 B1 | 4/2003 | Obradovich et al. |
| 6,587,785 B2 | 7/2003 | Jijina et al. |
| 6,807,481 B1 | 10/2004 | Gastelum |
| 8,055,443 B1 | 11/2011 | Uyeki et al. |
| 8,160,811 B2 | 4/2012 | Prokhorov |
| 8,332,242 B1 | 12/2012 | Medina, III |
| 8,606,512 B1 | 12/2013 | Bogovich et al. |
| 2004/0102898 A1 | 5/2004 | Yokota et al. |
| 2007/0067079 A1* | 3/2007 | Kosugi ............... G07C 5/085 701/32.4 |
| 2011/0043377 A1 | 2/2011 | McGrath et al. |

(Continued)

OTHER PUBLICATIONS iTunes; "Inrix® XD™ Traffic Maps, Routes & Alerts"; by Inrix, Inc., May 23, 2014, https://itunes.apple.com/us/app/inrix-xd-traffic-maps-routes/id324384027?mt=8.

(Continued)

*Primary Examiner* — Abby Yee Lin
*Assistant Examiner* — Paul A Castro
(74) *Attorney, Agent, or Firm* — Jennifer M. Stec; Brooks Kushman P.C.

(57) ABSTRACT

Traffic incident information may be clustered to determine geographical locations in which a statistically-increased level of traffic incidents occur. Indices indicative of vehicle operating conditions within the locations may be generated according to crowd-sourced event information factors and an index function including coefficients defining contributions of the factors to the indices. The coefficients may be optimized to minimize error between the index-predicted statistically-increased level areas and the clustered traffic incident information.

8 Claims, 6 Drawing Sheets

(56) References Cited

U.S. PATENT DOCUMENTS

| | | | |
|---|---|---|---|
| 2012/0130625 A1* | 5/2012 | Srivastava | G01C 21/3492 |
| | | | 701/119 |
| 2012/0136567 A1* | 5/2012 | Wang | G01C 21/3461 |
| | | | 701/414 |
| 2012/0179363 A1 | 7/2012 | Pierfelice | |
| 2014/0005923 A1 | 1/2014 | Bank et al. | |
| 2014/0074402 A1 | 3/2014 | Hassib et al. | |
| 2014/0278074 A1* | 9/2014 | Annapureddy | G01C 21/3453 |
| | | | 701/468 |
| 2015/0166072 A1* | 6/2015 | Powers | B60W 40/06 |
| | | | 701/1 |

OTHER PUBLICATIONS

Waze Social GPS Maps & Traffice—"Android Apps on Google Play"; Jun. 18, 2014; https://play.google.com/store/apps/details?id=com.waze&hl=en.

* cited by examiner

PERSONALIZED ROUTE INDICES VIA CROWD-SOURCED DATA

TECHNICAL FIELD

The illustrative embodiments generally relate to a method and apparatus for training and personalization of road indices generation.

BACKGROUND

Certain roads and intersections have a higher incidence of traffic incidents than other roads and intersections, in any given area. This may be due to higher traffic, higher speed, or poorly designed road layouts. Other than a driver observing traffic incidents frequently occurring at certain locations; however, it can be difficult for a driver to generally discern where traffic incidents frequently occur. This is even more the case when a driver is traveling through a new area, where there has been no chance for that driver to observe any previous traffic incidents.

SUMMARY

In a first illustrative embodiment, a system includes a processor configured to cluster traffic incident information to determine geographical locations in which a statistically-increased level of traffic incidents occur; generate indices indicative of vehicle operating conditions within the locations according to crowd-sourced event information factors and an index function including coefficients defining contributions of the factors to the indices; and optimize the coefficients to minimize error between the index-predicted statistically-increased level areas and the clustered traffic incident information.

In a second illustrative embodiment, a system includes a processor of a vehicle configured to send, to an index server, event information indicative of current driving conditions for the vehicle; request, from the index server, an index for a geographic location; and receive the index, from the index server, computed according to coefficients to an index function defining contributions of factors of the event information to driving incident likelihood.

In a third illustrative embodiment, a non-transitory computer-readable medium comprising instructions that, when executed by a processor of a vehicle, cause the processor to send, to an index server, event information indicative of current driving conditions for the vehicle; request, from the index server, an index for a geographic location; and receive the index, from the index server, computed according to coefficients to an index function defining contributions of factors of the event information to driving incident likelihood.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A road index is a value indicative of an amount of likelihood of a vehicle experiencing a traffic incident for a given road or location. A system may be configured to assign road indices to road segments to inform drivers to either take caution on those segments or reroute their trajectory to avoid those segments altogether. In some cases, road indices may be static, meaning that the indices reflect the relatively static information available to them (e.g., road pavement condition, road geometry, road curvature and speed limits. The road indices may be made dynamic by augmenting the static data inputs to the road indices with crowd-sourced data to include inputs associated with dynamic conditions (e.g., as traffic congestion, average traffic speed, current vehicle speed, weather, etc.).

A system may be configured to generate dynamic road indices or static route indices based on multiple inputs reflective of various factors represented by the generation. However, while in many examples contributions of road geometry, weather, and traffic, are all represented in the generated road indices, a specific contribution weight or coefficient of each factor may not be readily available.

An improved system for generation of road indices may be configured to receive crowd-sourced information with respect to events detected by vehicles traversing the roads or at the locations. Based on the uploaded data, traffic incidents and other information may be detected in real-time and used to refine the coefficients of a road index. Moreover, the system may receive the crowd-sourced data, and may correlate the identified activity to the factors present in the road index.

In some cases, the system may be further configured to train using the crowd-sourced events data to create road indices personalized to the driver. In an example, a specific driver and vehicle combination may systematically perform a certain traffic incident prone maneuver in a specific location, while other vehicles rarely report similar activity for the given location. Based on this driver-specific information, the system may be configured to provide a road index for the driver that is tailored to reflect the likelihoods of traffic incidents specific to that driver. Further aspects of the generation, training and personalization of road indices are discussed in detail below.

Figure 1:
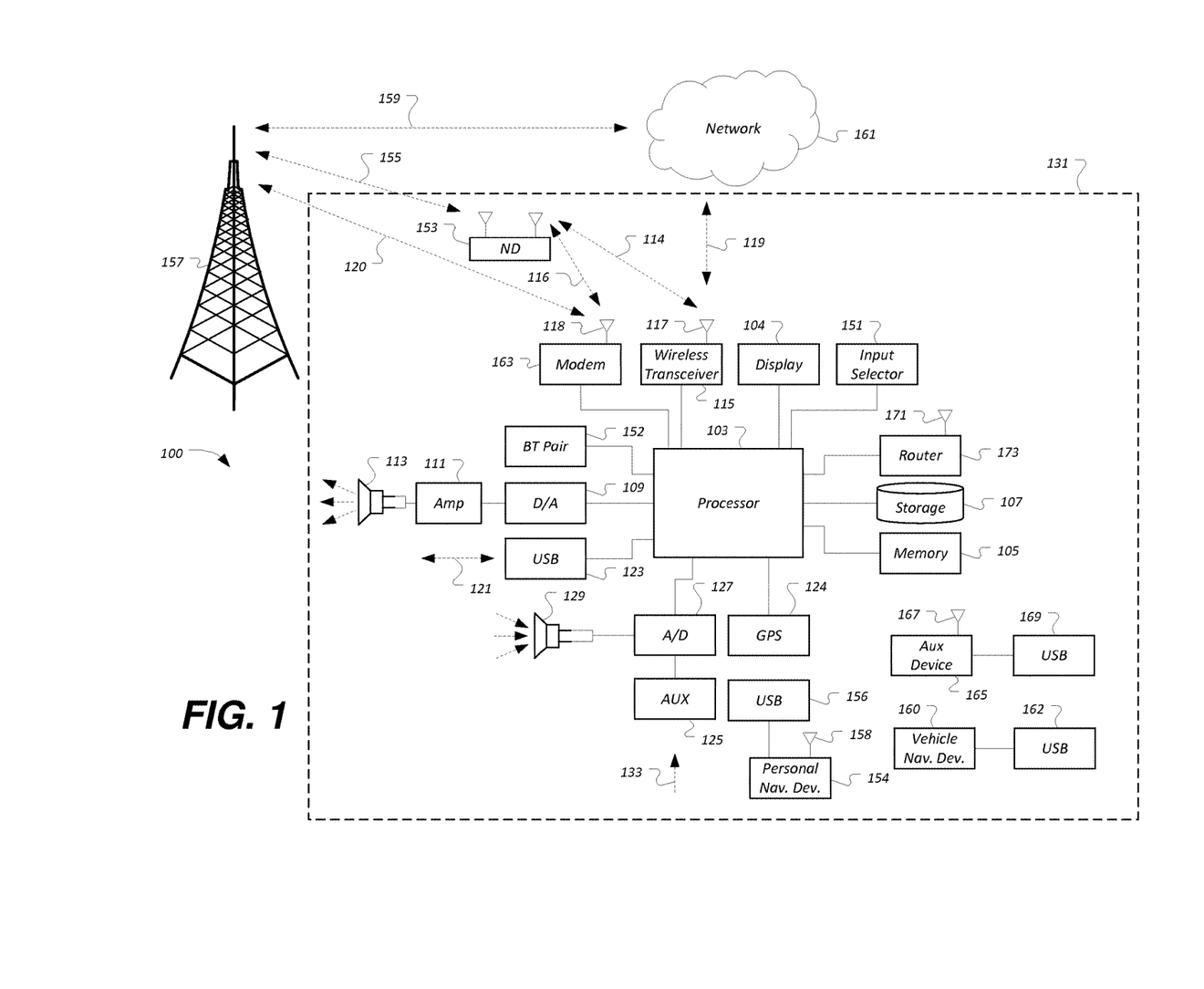
FIG. 1 shows an illustrative vehicle computing system.

FIG. 1 illustrates an example block topology for a vehicle based computing system 100 (VCS) for a vehicle 131. An example of such a VCS 100 is the SYNC system manufactured by THE FORD MOTOR COMPANY. A vehicle 131 enabled with a VCS 100 may contain a visual front end interface 104 located in the vehicle 131. The user may also be able to interact with the interface 104 if it is provided, for example, with a touch sensitive screen. In another illustrative embodiment, the interaction occurs through, button presses, spoken dialog system with automatic speech recognition and speech synthesis.

In the illustrative VCS 100 shown in FIG. 1, a processor 103 (e.g., a CPU, an application microprocessor, a modem processor, etc.) controls at least some portion of the operation of the VCS 100. Provided within the vehicle 131, the processor 103 allows onboard processing of commands and routines. Further, the processor 103 is connected to both non-persistent memory 105 and persistent storage 107. In this illustrative embodiment, the non-persistent memory 105 is random access memory (RAM) and the persistent storage 107 is a hard disk drive (HDD) or a flash memory. In general, persistent (non-transitory) storage 107 can include all forms of storage that maintain data when a computer or other device is powered down. These include, but are not limited to, HDDs, compact disks (CDs), digital versatile disks (DVDs), magnetic tapes, solid state drives (SSDs), portable universal serial bus (USB) drives and any other suitable form of persistent storage.

The processor 103 is also provided with a number of different inputs allowing the user to interface with the processor 103. In this illustrative embodiment, a microphone 129, an auxiliary input 125 (for input 133), a USB input 123, a GPS input 124, the front end interface 104 (which may include a touchscreen display), and a wireless transceiver 115 (such as a BLUETOOTH input) are all provided. An input selector 151 is also provided, to allow a user to swap between various inputs. Input to both the microphone 129 and the auxiliary input 125 may be converted from analog to digital by a converter 127 before being passed to the processor 103. Although not shown, numerous of the vehicle 131 components and auxiliary components in communication with the VCS 100 may use a network (such as, but not limited to, a controller area network (CAN) bus) of the vehicle 131 to pass data to and from the VCS 100 (or components thereof).

Outputs to the system can include, but are not limited to, a visual display 104 and a speaker 113 or audio system output. The speaker 113 is connected to an amplifier 111 and receives its signal from the processor 103 through a digital-to-analog converter 109. Output can also be made to a remote BLUETOOTH device such as a personal navigation device (PND) 154 or a USB device such as vehicle navigation device 160 along the bi-directional data streams shown at 119 and 121 respectively.

In one illustrative embodiment, the system 100 uses the wireless transceiver 115 to communicate 117 with a nomadic device (ND) 153 of a user (e.g., a cellular phone, a smart phone, a personal digital assistant (PDA), or any other mobile device having wireless remote network connectivity). The nomadic device 153 can then be used to communicate 159 with a network 161 outside the vehicle 131 through, for example, communication 155 with a cellular tower 157. In some embodiments, tower 157 may be a WiFi access point. Exemplary communication between the nomadic device 153 and the wireless transceiver 115 is represented by connection 114. Using the paired nomadic device 153, data may be communicated between the processor 103 and network 161 over the connection 114 utilizing, for example, a data-plan, data over voice, or DTMF tones associated with nomadic device 153.

Pairing a nomadic device 153 and the wireless transceiver 115 can be instructed through a button 152 or similar input. Accordingly, the processor 103 is instructed that the wireless transceiver 115 of the VCS 100 will be paired with a wireless transceiver in a nomadic device 153 (e.g., a BLUETOOTH transceiver integrated with the nomadic device 153, not shown).

Additionally or alternatively, the VCS 100 may include an onboard modem 163 having an antenna 118 configured to communicate 116 data between the processor 103 and the network 161. This communication may be performed over a data band and/or over a data channel. The nomadic device 153 can then be used to communicate 159 with the network 161 outside of the vehicle 131 through, for example, communication 155 with a cellular tower 157. In some embodiments, the modem 163 may establish communication 120 with the tower 157 for communicating with network 161. As a non-limiting example, the modem 163 may be a USB cellular modem 163 and communication 120 may be by way of a cellular communication protocol.

In one illustrative embodiment, the processor 103 is provided with an operating system including an application programming interface (API) to communicate with modem application software. The modem application software may access an embedded module or firmware on the wireless transceiver 115 to complete wireless communication with a remote wireless transceiver (such as that found in a nomadic device 153). BLUETOOTH is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle 131. Another communication means that can be used in this realm is free-space optical communication (such as IrDA) and non-standardized consumer infrared (IR) protocols.

In another embodiment, nomadic device 153 includes a modem for voice band or broadband data communication. In the data-over-voice embodiment, a technique known as frequency division multiplexing may be implemented when the owner of the nomadic device 153 can talk over the nomadic device 153 while data is being transferred. At other times, when the owner is not using the device, the data transfer can use the whole bandwidth (300 hertz (Hz) to 3.4 kilohertz (kHz) in one example). While frequency division multiplexing may be common for analog cellular communication between the vehicle 131 and the Internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to two megabits per second (mbs) for stationary or walking users and 385 kilobits per second (kbs) for users in a moving vehicle 131. 3G standards are now being replaced by IMT-Advanced (4G) which offers 100 mbs for users in a vehicle 131 and one gigabit per second (gbs) for stationary users. If the user has a data-plan associated with the nomadic device 153, it is possible that the data-plan allows for broad-band transmission and the system could use a much wider bandwidth (speeding up data transfer). In still another embodiment, nomadic device 153 is replaced with a cellular communication device (not shown) that is installed to vehicle 131. In yet another embodiment, the nomadic device 153 may be a wireless local area network (LAN) device capable of communication over, for example (and without limitation), an 802.11g network (i.e., WiFi) or a WiMax network.

In one embodiment, incoming data can be passed through the nomadic device 153 via a data-over-voice or data-plan, through the onboard BLUETOOTH transceiver and into the internal processor 103 of the vehicle 131. In the case of certain temporary data, for example, the data can be stored on the HDD or other persistent storage 107 until such time as the data is no longer needed.

Additional sources that may interface with the vehicle 131 include a PND 154, having, for example, a USB connection 156 and/or an antenna 158, a vehicle navigation device 160 having a USB 162 or other connection, an onboard GPS device 124, or remote navigation system (not shown) having connectivity to network 161. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the processor 103 could be in communication with a variety of other auxiliary devices 165. These auxiliary devices 165 can be connected through a wireless 167 or wired 169 connection. Auxiliary device 165 may include, but are not limited to, personal media players, wireless health devices, portable computers, and the like.

Also, or alternatively, the processor 103 could be connected to a vehicle-based wireless router 173, using for example a WiFi (IEEE 803.11) 171 transceiver. This could allow the processor 103 to connect to remote networks in range of the local router 173.

In addition to having exemplary processes executed by a VCS 100 located in a vehicle 131, in certain embodiments, the exemplary processes may be executed by a computing system in communication with a VCS 100. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor 103 to perform the process. All processes need not be performed in their entirety, and are understood to be examples of types of processes that may be performed to achieve elements of the invention. Additional steps may be added or removed from the exemplary processes as desired.

Figure 2:
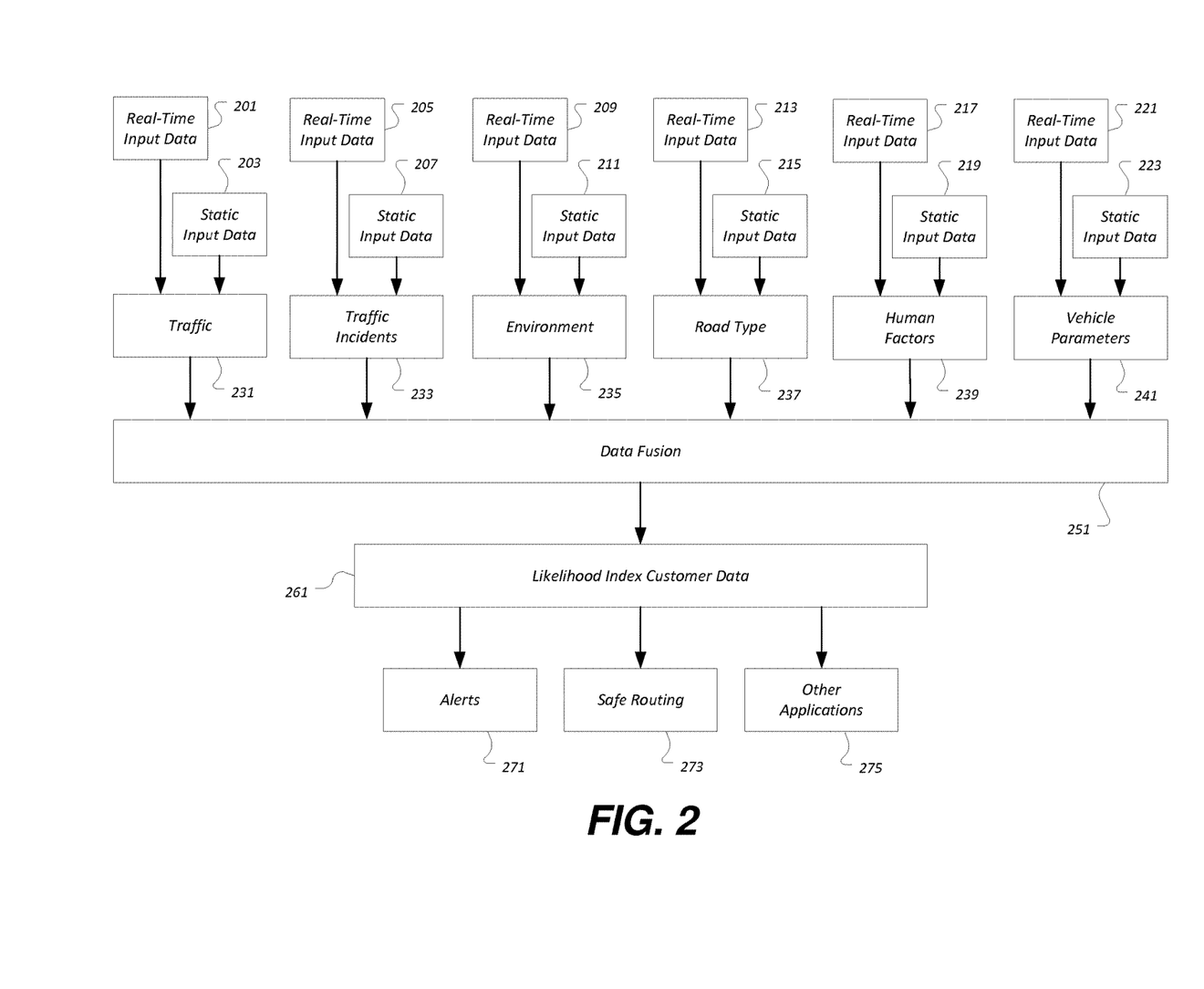
FIG. 2 shows an illustrative example of road index inputs.

FIG. 2 shows an illustrative example of road index inputs. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative embodiments, crowd-sourced data is used to generate road indices for various roads in a given area. By utilizing data from a variety of sources, and based on a variety of factors, roads in an area can be analyzed in a relatively comprehensive and swift fashion. Also, since correlations may be drawn between the various factors and the degree of traffic incidents, assumptions can be made for both known and unknown roads. For example, if traffic incidents on roads with 55 mph speed limits are observed with 0.05% frequency in rainfall of over 0.5 inches per hour, then if a driver is in new territory in a storm, the degree of traffic incidents on 55 mph roads can be "guessed." This is a very simplistic example, but it shows how gathered data can be used to make assumptions about roads for which no previous data has been gathered.

Using the known data about roads and projected likelihoods of traffic incidents for unknown roads, routes can be developed that reduce the likelihood of traffic incidents, at least based on frequency of traffic incidents for the roads. While a certain route with lower road indices for roads may take longer, it might be a generally "safer" route and thus would be desirable for any number of safety-related reasons.

In the illustrative example of a system shown in FIG. 2, a variety of exemplary factors are shown. Of course, these are not the only factors that could be considered, any suitable factors that aid in the evaluation of traffic incident likelihood may also be utilized.

In this example, each of the factors has real time data and static data input thereto. Examples will be given with respect to each factor, but these are for illustrative purposes only, and are not intended to limit the inputs or data. For example, with respect to traffic 231, real time data 201 can include, but is not limited to, an average speed of traffic, vehicle density and vehicle types, if known. Static data may be limited for certain categories, such as traffic, where the category is essentially dynamic, but certain static data can be used if appropriate. For example, historical traffic data can be used for evaluating likelihood at certain times of day on upcoming sections of route that may still be a distance away.

Other inputs to the data fusion algorithm 251 can include traffic incident data 233. This can include real-time traffic incident data 205, such as, but not limited to, severity and type of current traffic incidents. Static data 207 to the traffic incident inputs can include, for example, a mean/median severity of traffic incidents, types of common traffic incidents on the road, and a history of traffic incidents (per day, per week, per month, time of occurrence, etc.).

Environment 235 on roads can also play a role in determining the traffic incident likelihood on the route. Environment can be useful in predicting traffic incident likelihood and also in comparing new and unknown roads to previously observed roads. Real time environmental data 209 can include, for example, without limitation, current visibility, weather/surface conditions, construction/hazard data, wind speed and temperatures. Static input data 211 can include, for example, data relating to traffic incident occurrence at different times of days, and historical data correlating traffic incidents to particular environmental conditions.

Road type data 237 can also be input as a factor in evaluating road traffic incident likelihood. This data is commonly static 215 and can include, but is not limited to, current surface roughness/potholes, road curve/radius, intersections (existence of, frequency, stop signs/lights/yields), road slopes, road surface types, road types (highway, city street, etc.), number of lanes, speed limits. Dynamic data 213 can also be used as an input, although it is infrequent that road data will be in dynamic flux.

Human factors 239 can also play a role in the determination. If data is known about a driver (through, for example, vehicle data reported by the vehicle), this can be useful. This data could be dynamic 217 or static 219. Data types can include, for example, speeding habits (current or historic), age of driver, driving experience, impairments, distraction, etc. Much of the data in this category can be both current and historic data, depending on what data is available, and is useful in determining a driver's own human effect on traffic incident likelihood when driving.

Another exemplary parameter, and the last of the examples, although other inputs are certainly also available, includes vehicle parameters 241. Real time data 221 (if available) can include, for example, without limitation, current vehicle brake conditions, tire pressures, on-board diagnostic warnings, the type of vehicle, etc. Static data 223, can include, for example, speed limits, directional traffic flows.

With respect to all of these factors, certain dynamic data may also be available as static historical data. Similarly, static historical data can be available as dynamic data when available from reporting vehicle systems, if appropriate.

The data fusion 251 portion of the system represent the algorithm(s) used to determine road indices for various roads indicative of traffic incident likelihood. This can be generated on a regular basis at regular intervals, or can be generated in an on-demand manner, depending on the architecture and capabilities of the data provision system(s). The output of this process is index customer data 261, which can be provided to various vehicles to display/utilize traffic incident likelihood data for roads along current or alternative routes.

This data can be used, for example, without limitation, in generating traffic incident likelihood alerts 271 (e.g., a certain road's traffic incident likelihood rises above a threshold, or perhaps outside the range of a common norm), safe routing (e.g., find roads along a route having only N traffic incident likelihood or lower), and by any other suitable application designed to utilize this data 275.

By recording and analyzing current data (reported by vehicles in transit, for example) and historical data, traffic incident likelihood patterns can be observed for commonly traveled roads across an entire road network. Observed correlations can also be used to predict the traffic incident likelihood of less commonly traveled roads, for which there may be less actual data available, so that traffic incident likelihood can be approximated even in unfamiliar or uncommon territory. Accordingly, drivers can proceed with some confidence that they have selected roads presenting only a selected likely degree of traffic incident likelihood.

Figure 3:
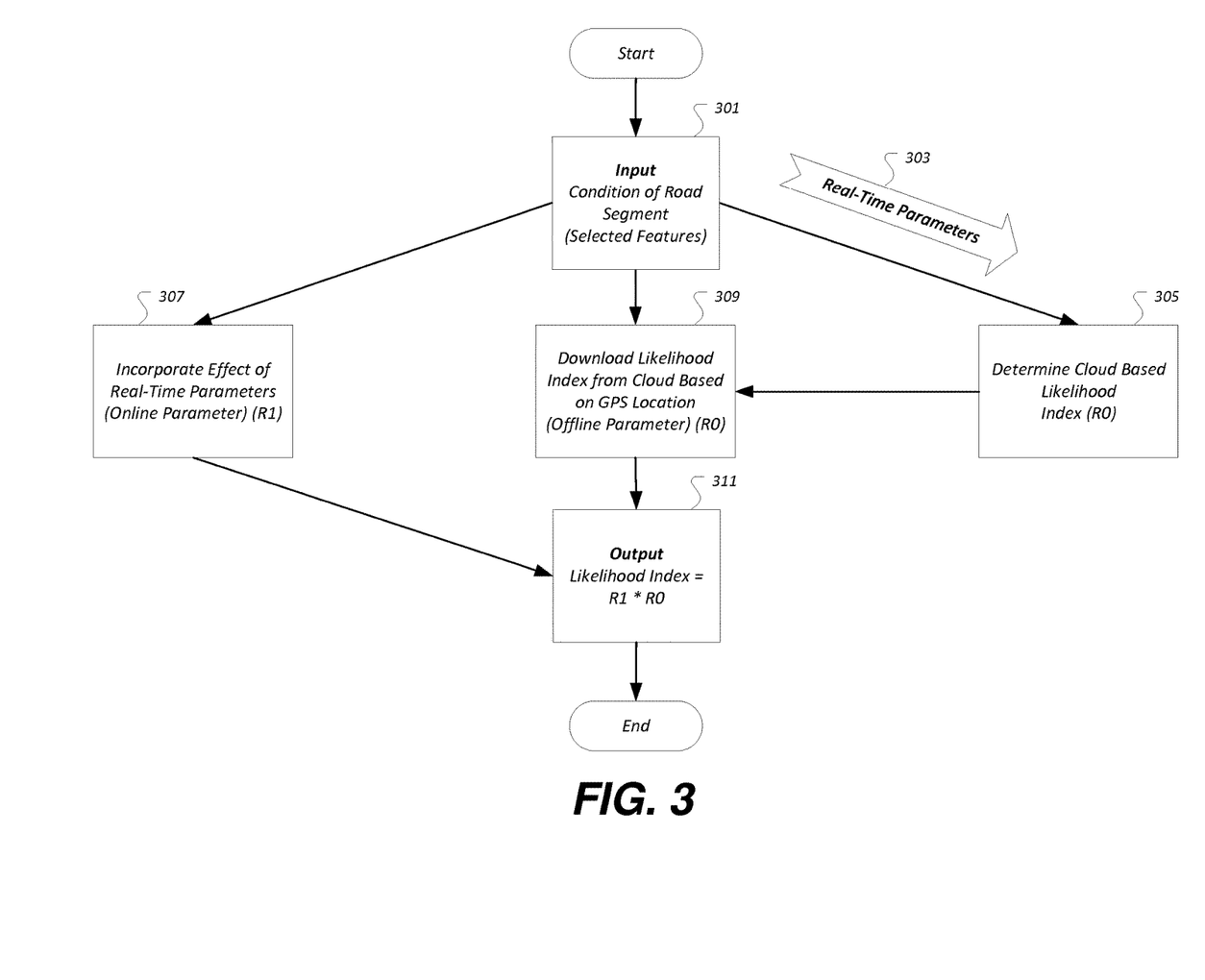
FIG. 3 shows an illustrative example of a road index generation process.

FIG. 3 shows an illustrative example of a road indices generation process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The rough approximation of a process in FIG. 3 shows some potential inputs 301 into a traffic incident likelihood evaluation system. Inputs relating to features of a road 303 can be fed into a cloud algorithm 305 to generate a base traffic incident likelihood index for the road (e.g., the static index based on known, fixed conditions). This index can be downloaded based on the GPS location of a vehicle or a GPS point along a route 309.

Also to be considered are dynamic variables that represent current dynamic conditions 307. The effect that these parameters have on traffic incident likelihood calculation can be refined over time, as more data is gathered and more correlation can be made between certain conditions and the result of driving in those conditions. This dynamic factor can be combined with the fixed traffic incident likelihood value 311 to produce an overall traffic incident likelihood index value for a given road or location.

Figure 4:
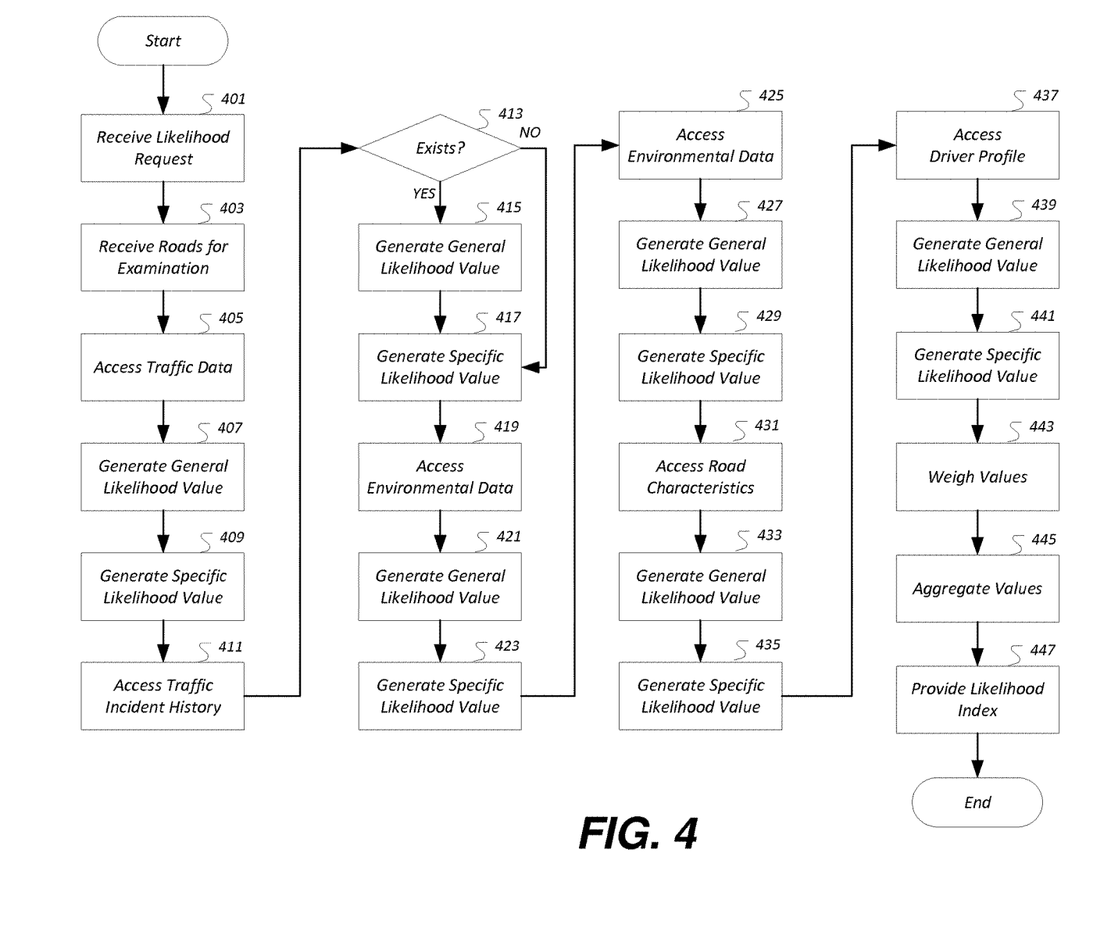
FIG. 4 shows an illustrative process for road index generation.

FIG. 4 shows an illustrative process for road traffic incident likelihood generation. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, a navigation computing system will generate routes including one or more roads for examination. If the driver desires to factor traffic incident likelihood in as a factor, for each road or portion of road, a call can be made to a traffic incident likelihood analysis process to determine a traffic incident likelihood index for the road or road portion. In this example, the process is launched with an incoming request for traffic incident likelihood analysis 401. In conjunction with the request, one or more roads, for which traffic incident likelihood analysis is desired, are also received 403.

For each factor associated with the road, in this example, dynamic and historical data is considered to generate an overall traffic incident likelihood value. In some cases, as shown in FIG. 3, historical data will already be factored into a base traffic incident likelihood value for the road, and will not need to be evaluated on the fly.

First, in this example, traffic-related data 405 is gathered. This can include, but is not limited to, average speeds of traffic, vehicle densities, vehicle types, etc. Historic traffic data can be used to generate a base-line traffic incident likelihood value for the road 407 (which could, if desired, be incorporated into an overall baseline value, as can each historic base-line generated in this example). Current traffic data can be used to generate a current specific traffic incident likelihood value based on actual conditions at the time of the request 409. Both types of information are useful, especially if the road or road segment is not immediately upcoming, because the usefulness of the "current" value will tend to decay with time.

Also gathered, in this example, is traffic incident history for the road 411. As with each of the examples, but shown with respect to only a few, this data can be ignored if the historical data does not exist 413. If there is historical data (severity of traffic incident, types of traffic incident, etc.), again, a baseline traffic incident likelihood value for the road in general based on traffic incident history may be generated 415. Further, if there are any current traffic incidents, a specific traffic incident likelihood value 417 may be generated based on current traffic incidents.

Environmental data can also be utilized 419. While historical data may not be as useful in this category, it can be used to generate an environmental baseline 421 for the road based on commonly occurring environmental conditions (bad lighting, time of day, etc.). Current data can also be used to generate current environmental specific traffic incident likelihood effects 423. As with any factor, weightings can always be applied to the values to offset the relative usefulness (based on, for example, observed correlations) of any of the utilized data. So, for example, current environmental data may be given 10× the weight of historical data if it is determined that current environmental data has much more realistic impact on current traffic incident likelihood than historical data. On the other hand, in rapidly changing environments, historical data may be weighted higher, to factor in the likelihood that conditions may change by the time the road is actually reached by the driver.

Also considered in this example is road characteristic data 425. This is an example of a case where historical data (e.g., the makeup of the road) is probably more likely to play a factor than current road data, since the road is unlikely to be undergoing significant changes on an ongoing basis. On the other hand, for dirt roads, for example, current road makeup (muddy, wet, etc.) may actually play as much of a factor as historical data. A general traffic incident likelihood value for the road 427 and a specific, current traffic incident likelihood value 429 for the road can be generated and utilized as appropriate.

A driver profile is also accessed, in this example 431. This profile stores data about the driving behaviors (observed and present) of a vehicle driver, as well as any useful demographic information about the driver than can be used to evaluate traffic incident likelihood. The driver data (age, experience, impairments, distractedness, tendency to speed or brake suddenly, etc.) can be used to generate both a general traffic incident likelihood profile for the driver 433 and a specific traffic incident likelihood profile 435 based on current conditions (such as, for example, distraction, speeding, etc.).

Finally, in this example, data about a vehicle is gathered 437. This data relates to a specific vehicle, in this example, namely, the vehicle requesting the traffic incident likelihood data. This data can include historic observed behavior under certain conditions for the vehicle, and can also include current vehicle state values (low tire pressure, worn brakes, low fuel, etc.). This data, as with the other data, can be used to generate a standard traffic incident likelihood profile for the vehicle historically 439, as well as a current traffic incident likelihood value for the vehicle based on current vehicle data 441.

In this example, the various generated traffic incident likelihood values can then be weighted 443 appropriately, based on each values observed effect on overall traffic incident likelihood. With time, this weighting can be made more precise, and may vary from road to road, vehicle to vehicle and driver to driver. As data is gathered and the impact of conditions on a certain driver or vehicle is known, weightings can be shifted to more accurately represent traffic incident likelihood to that driver. Also, weightings may be shifted based on the effect that the static or dynamic values generally have based on a certain category. Further aspects of tuning the weighting are discussed in detail below with respect to FIG. 6.

Once the values have been weighted, if weighting is desired, the process can aggregate the values for each road or road portion 445 and provide an output, back to the requesting entity (typically a vehicle) of traffic incident likelihood indices for each identified road or road portion 447. This data can then be used in an appropriate manner by the requesting entity.

Figure 5:
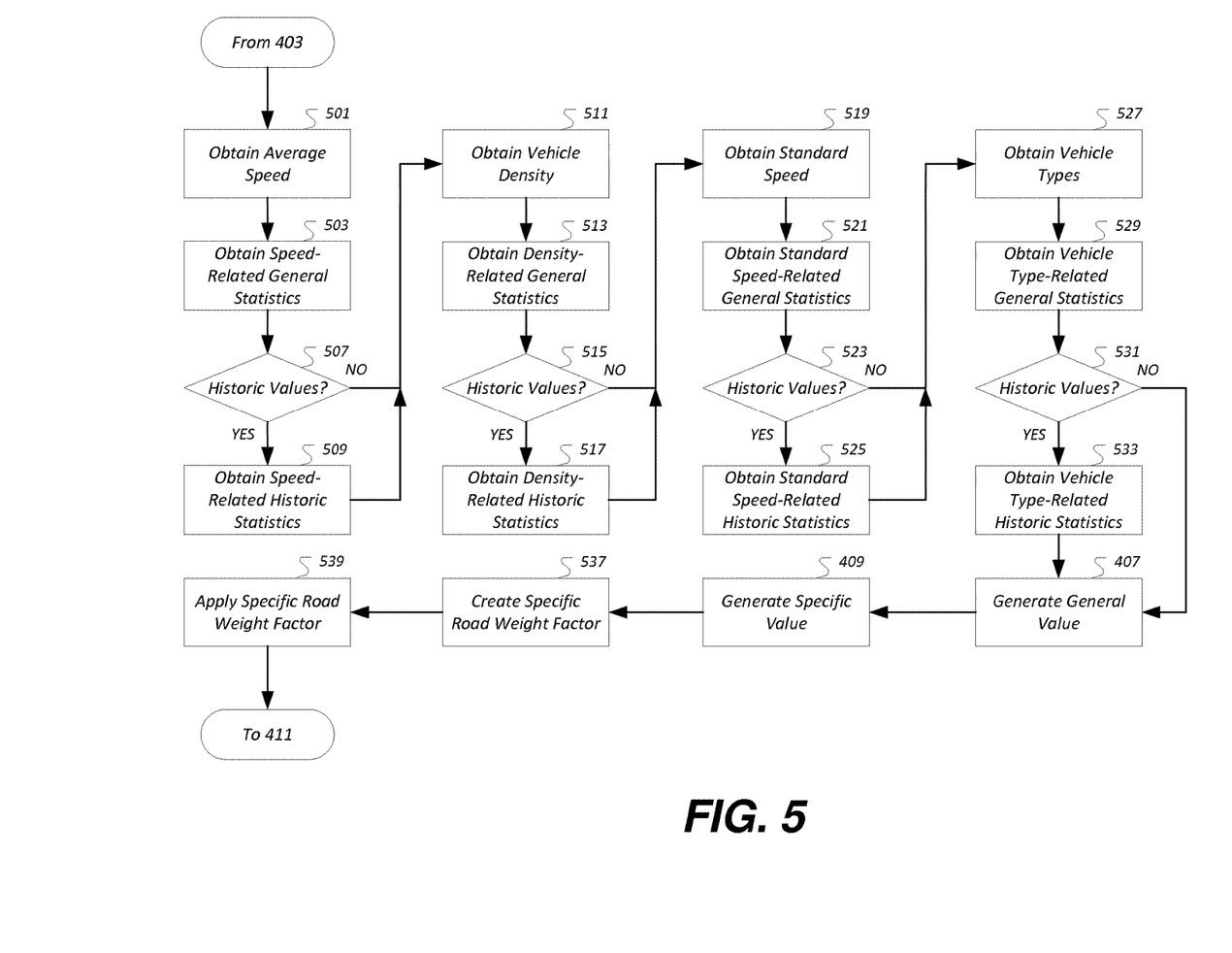
FIG. 5 shows an illustrative process for road index value determination.

FIG. 5 shows an illustrative process for traffic incident likelihood value determination. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 5, gathering of traffic-related data is shown in greater detail, as a representative example of how data can be gathered and utilized. A similar process (with the appropriate data types) can be used for each factor in the traffic incident likelihood generation input.

For example, in this illustrative process, current vehicle average speed is obtained 501. As with all considered factors, vehicle speed will have some (assigned or determined) effect on overall traffic incident likelihood of a road. One common way to determine how speed will affect traffic incident likelihood can be to observe general statistics on speed vs. traffic incident likelihood 503. This is representative of how speed changes traffic incident likelihood on all roads, or all roads in an area, for example.

If the requested road has historic available data 507, then the historic data may be considered to determine how speed changes traffic incident likelihood on the specific road 509. For example, increasing speed by 5 miles per hour (MPH) may change traffic incident likelihood by five (on an arbitrary scale). But, on a very curvy road, increasing speed by 5 MPH may be observed to, on that specific road, increase traffic incident likelihood by a higher factor (e.g., a factor of twenty). Accordingly, if available, both the specific and general effect of speed on traffic incident likelihood will be considered.

Similarly, vehicle density 511 for the route will be obtained. Once again, a general effect of density may be observed 513 and, for a given road, if available 515, a historic effect of density on traffic incident likelihood 517 may be observed. With respect to each factor, to the extent that specific data for a road will provide different observed traffic incident likelihood effects than will general data, both types of data may be considered.

Also considered in this example are speed limits 519 and vehicle types 527 (e.g., is the traffic comprised of commuter, commercial, etc.). For both factors, general relationships of the factor to traffic incident likelihood can be considered 521, 529. Also, if available 523, 531, historic, observed effects of the factors for a given road 525, 533 can be considered.

As mentioned above, while contributions of road geometry, weather, and traffic, may be represented in the generated traffic incident likelihood indices, a specific contribution weight of each factor may not be readily available. As an example, Equation (1) illustrates one possible traffic incident likelihood index calculation accounting for road geometry, weather conditions, and crowd-sourced data:

$$Ri(k)=f_1(\text{geometry}(k),a_1,\ldots,a_n)+f_2(\text{weather}(k),a_{n+1},\ldots,a_m)+f_3(\text{crowd data}(k),a_m+1,\ldots,a_l), \text{ where} \quad (1)$$

k represents a location for which a traffic incident likelihood index Ri is being calculated; and $a_1, \ldots, a_l$ represent coefficients used to weight the individual factors in creation of the traffic incident likelihood index.

In order for the traffic incident likelihood index Ri to correlate well to traffic incident prone operating conditions, the coefficients $a_1, \ldots, a_l$ may be trained to appropriately emphasize the contributing factors (e.g., the road geometry, weather conditions, and crowd-sourced data in the given example). One approach to train the coefficients $a_1, \ldots, a_l$ may be through use of historical traffic incident data, such as that provided by government agencies or insurance companies to summarizer relatively traffic incident prone intersections or road segments. However, historical traffic incident data may be relatively sparse (e.g., incomplete with respect to possible intersections and road segments) and not systematically updated (e.g., updated erratically or with a large interval such as once or twice per year). Therefore as new traffic incident prone routes emerge, or as others are repaired or become less traveled, their associated traffic incident likelihood indices Ri may become outdated. Furthermore, a training of the coefficients $a_1, \ldots, a_l$ may be unable to provide a personalized traffic incident likelihood index Ri, due to lack of personalized data to train the traffic incident likelihood index coefficients for a particular driver.

An improved system for route traffic incident likelihood indices may be configured to receive crowd-sourced information with respect to events detected by vehicles 131 traversing the roads or at the locations. In an example, internal data modems 163 of the vehicles 131 may be utilized to upload controller area network (CAN) bus data to a traffic incident likelihood server for analysis and route traffic incident likelihood index generation. In another example, a nomadic device 153 (e.g., a mobile phone or other network-capable device of the driver) may upload information such as vehicle speed and vehicle position. Based on the uploaded data, traffic incident and other information may be detected in real-time by a traffic incident likelihood index server and used to refine the coefficients used to generate the traffic incident likelihood indices.

The crowd-sourced data may also capture traffic incident prone activity that, although may not have resulted in a traffic incident, may indicate a relatively traffic incident prone route condition, especially if these events are confirmed by having been recorded with high frequency in a specific area. Examples of these traffic incident prone activities include hard braking events (e.g., high rates of deceleration), high rates of steering angle, etc. The system may receive the crowd-sourced data, and may correlate the identified activity to the factors present in the route traffic incident likelihood index.

In some cases, the system may be further configured to train using the crowd-sourced traffic incident prone events data to create road traffic incident likelihood indices personalized to the driver. In an example, a specific driver and vehicle combination may systematically perform a certain traffic incident prone maneuver in a specific location, while other vehicles rarely report similar activity for the given location. Based on this driver-specific information, the system may be configured to provide a traffic incident likelihood index for the driver that is tailored to reflect the traffic incident likelihoods specific to that driver.

Figure 6:
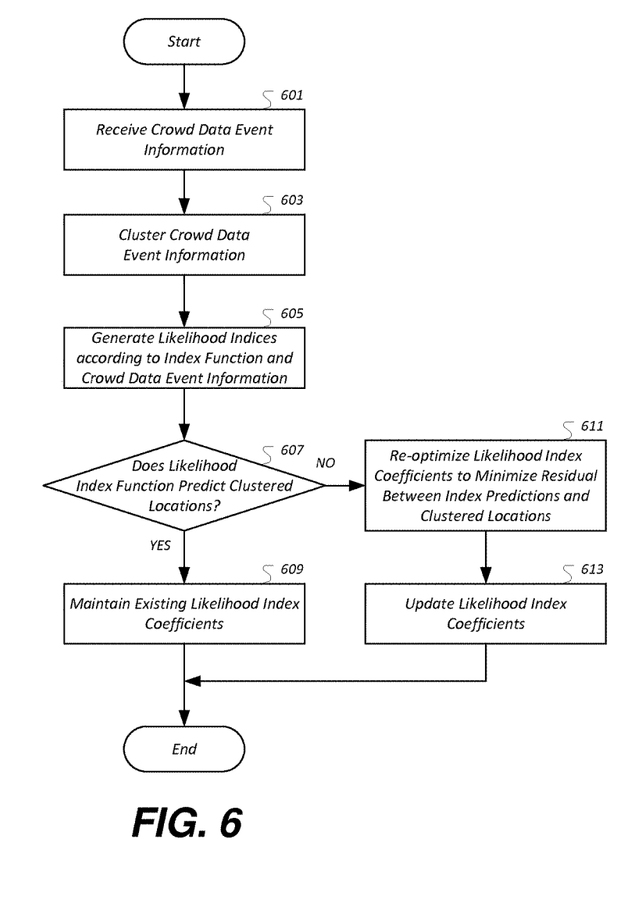
FIG. 6 shows an illustrative process for training and personalization of road indices generation.

FIG. 6 illustrates an example process for training and personalization of road traffic incident likelihood indices generation. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 6, one or more vehicles 131 upload crowd-sourced information 601 to the traffic incident likelihood index server with respect to events detected by vehicles 131 traversing roads or at various locations. This information may include, for example, the GPS location the vehicle 131 uploading the data, as well as aspects of real-time input data 201, 205, 209, 213, 217, e.g., relating to traffic, traffic incidents, environment, road type, human factors, and vehicle parameters, such as discussed in detail above with respect to FIG. 2. This crowd-sourced information may be compiled by the vehicle processor 104 from data traversing the controller area network (CAN) bus data, and provided to the traffic incident likelihood index server utilizing internal data modems 163 of the vehicles 131 or via nomadic devices 153 paired to the vehicles 131.

Utilizing the received crowd-sourced information, the traffic incident likelihood event server may cluster 603 the crowd-sourced information. Clustering may refer to the grouping of elements of data in such a way that data elements in the same cluster are more similar to one another with respect to one or more factors of the crowd-sourced information 601 than to those in other clusters. The data may be clustered to identify locations where certain factors of crowd-sourced information 601 correspond to higher traffic incident likelihood locations. In an example, the traffic incident likelihood event server may be configured to cluster locations in which factors indicative of hard braking and/or hard steering events occur with relative frequency as compared to other locations.

The traffic incident likelihood event server may further generate traffic incident likelihood indices 605 according to the traffic incident likelihood index function and the crowd-sourced information 601. As discussed above with respect to FIGS. 2-5, the traffic incident likelihood indices 605 may be generated, for example, utilizing an equation similar to that of the Equation (1) to perform the data fusion 251 across static and dynamic data elements to determine traffic incident likelihood indices for various roads. For an initial run, the coefficients $a_1, \ldots, a_l$ used to weight the indicial factors in creation of the traffic incident likelihood index may be initial default values. The initial default values for the coefficients $a_1, \ldots, a_l$ for an area or location may be, for example, equal weightings across factors, an average of weightings for adjacent and previously computed areas or locations, or an average of weightings across all areas or locations, as some possibilities.

The traffic incident likelihood event server may determine, at operation 607, whether the traffic incident likelihood indices computed at operation 605 predict the clustered locations determined at operation 603. For instance, the server may perform a residual regression analysis determine, for the computed traffic incident likelihood indices, whether actual traffic incident data supports that the computed traffic incident likelihood indices indicative of high traffic incident likelihood are at those locations or areas are of demonstrated higher traffic incident levels. As another example, the server may determine whether the computed traffic incident likelihood indices accurately indicate areas of higher driving traffic incident likelihood (with or without corroborating traffic incident data) where high traffic incident likelihood maneuvers such as clusters of hard braking or swerve maneuvers occur. As yet a further example, the server may determine whether the computed traffic incident likelihood indices accurately indicate areas of higher driving traffic incident likelihood where clusters of hard braking or swerve maneuvers occur during wet conditions. If the residuals that are determined are within a predefined threshold (e.g., where a sum of the squares of the computed residuals for each traffic incident likelihood index is within a predefined limit), then the traffic incident likelihood event server may determine that the coefficients $a_1, \ldots, a_I$ are acceptable and may pass control to operation 611 to maintain the existing coefficients $a_1, \ldots, a_I$ for continued use in computing the traffic incident likelihood indices.

If the server instead determines that the traffic incident likelihood indices are not within the predefined threshold and therefore do not sufficiently predict actual traffic incident or driving data that certain locations or areas are of higher traffic incident likelihood, then the server may re-optimize 611 the traffic incident likelihood index coefficients to the traffic incident likelihood index function to minimize a residual between the traffic incident likelihood index predictions and the clustered locations. This re-optimization may be performed, for example, by way of sensitivity analysis techniques such as regression analysis (e.g., fitting a linear regression to the model response and using standardized regression coefficients as direct measures of sensitivity), variance-based analysis (e.g., quantifying input and output uncertainties as probability distributions, and decomposing the output variance into parts attributable to crowd-sourced information inputs and combinations of these inputs, such that sensitivity of the output to an element of crowd-sourced information is measured by the amount of variance in the output caused by that input), and screening (e.g., weeding out un-influential aspects of the received crowd-sourced information before applying a more informative analysis to the remaining set of received crowd-sourced information). The result of the analysis may be to update 613 the set of coefficients $a_1, \ldots, a_I$ to a new set that provide better predictive power with respect to variance between the cluster locations of high traffic incident likelihood factors and the locations indicated as having historically clustered traffic incidents or other events.

By training route traffic incident likelihood indices based on clustered crowd-sourced data, the system may yield insights into how elements such as weather, road geometry and traffic information may be weighted to increase the predictive value of the computed traffic incident likelihood indices. Accordingly, the system may train the generation of the route traffic incident likelihood indices with respect to multiple factors of the crowd-sourced information, rather than merely with respect to correlation with historical traffic incident data. As the crowd-sourced data may be collected from the vehicles 131 by the traffic incident likelihood index server relatively continuously, route traffic incident likelihood indices and coefficients may also be updated continuously. Furthermore, characterizing traffic incident likelihood index in terms of traffic incident prone events rather than merely in terms of traffic incidents may provide an opportunity to preemptively classify a route as higher traffic incident likelihood, potentially eliminating the necessity for a traffic incident to occur before a route may be classified as higher traffic incident likelihood. Moreover, the route traffic incident likelihood index may change for a given location may change deterministically based on current weather or traffic information. Additionally, for a similar location having similar weather and traffic, the traffic incident likelihood indices may be relatively consistent.

As a further possibility, the system may be utilized to provide coefficient weightings that are driver-specific. Thus, this method provides a way to develop personalized route traffic incident likelihood indices that reflect personal driving characteristics rather than assuming that all drivers have the same sensitivity to factors such as weather, road geometry, and traffic.

In an example, a specific driver when operating a particular vehicle 131 during particular conditions may systematically performs traffic incident prone maneuvers in a specific location (e.g., sudden braking maneuvers as evidenced by crowd-sourced information from the vehicle 131), while crowd-sourced information from other vehicles 131 may rarely report similar activity for the given location. This identification may be performed, for example, by performing a comparison of a clustering of the crowd-sourced information for the vehicle 131 to a clustering of the crowd-sourced information for other vehicles 131 (including or excluding the vehicle 131 of the driver).

As another possibility, a first clustering and weighting may be performed using information for all vehicles 131. Based on those results, a second clustering and weighting may then be performed using information for the vehicle 131 of the driver using the first weighting results as a baseline set of coefficients. If the baseline set of coefficients exceed a particular predefined threshold, then a re-optimization of the baseline set of coefficients may be performed using the information for the vehicle 131 of the driver. As yet a further possibility, the behavior of the driver may be emphasized by giving a higher amount of contribution to the crowd-sourced information for the vehicle 131 when clustering the crowd-sourced information for the vehicles 131 as compared to the crowd-sourced information for other vehicles 131.

Accordingly, a driver-specific set of coefficients may be computed that better reflect the traffic incident likelihood s to the particular driver, which in turn may be used to provide driver-specific traffic incident likelihood indices to reflect the traffic incident likelihood specific to that driver. For instance, a driver may have a particular susceptibility to making driving errors while turning during wet conditions, and therefore, weather factors relating to rain may be assigned coefficients to weight those factors higher in computation of traffic incident likelihood indices for that driver. Thus, two vehicles in the same location driving under the same operating and environmental conditions may have different route traffic incident likelihood indices (and potentially different recommended routes) based on the different driver-specific coefficients.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a vehicle processor programmed to
cluster traffic incident information to determine geographical locations in which a statistically-increased level of traffic incidents occur;
generate traffic incident likelihood indices predictive of traffic incidents levels within the geographic locations according to crowd-sourced event information factors and an index function including coefficients defining contributions of the information factors to the traffic incident likelihood indices, the index function being of the form $$Ri(k)=f\_1(geometry(k),a\_1,\ldots,a\_n)+f\_2(weather(k),a\_(n+1),\ldots,a\_m)+f\_3(crowd\ data(k),a\_(m+1),\ldots,a\_l),$$

where Ri represents the traffic incident likelihood indices, k represents the geographic locations for which the indices Ri are being calculated, $f_1$ represents a function of road geometry information, $f_2$ represents a function of weather conditions, $f_3$ represent a function of the crowd-sourced event information, and $a_1, \ldots, a_l$ represent the coefficients defining contributions used to weight the factors in creation of the indices Ri; and
optimize the coefficients to minimize error between the indices Ri and the clustered traffic incident information; and
generate traffic incident likelihood alerts responsive to the traffic incident likelihood indices exceeding a threshold level of traffic incident likelihood.

2. The system of claim 1, wherein the crowd-sourced event information includes at least two of traffic data, environment data, road type data, human factor data, and vehicle parameter data.

3. The system of claim 1, wherein the factors include hard braking events and hard steering events.

4. The system of claim 1, wherein the vehicle processor is further configured to optimize the coefficients according to historical crowd-sourced event information of a specific vehicle driver to determine coefficients configured to generate indices optimized for the driver.

5. The system of claim 1, wherein the traffic incident information further includes traffic incidents identified according to the crowd-sourced event information.

6. The system of claim 1, wherein the vehicle processor is included in an index server device further configured to receive the crowd-sourced event information over a wide area network from a plurality of vehicles.

7. The system of claim 1, wherein the vehicle processor is further configured to: receive a request for an index for a geographic location from a vehicle; and provide the index to vehicle according to the index function and coefficients.

8. The system of claim 7, wherein the geographic location is a current geographic area in which the vehicle is located.

* * * * *